United States Patent [19]
Furkert

[11] 3,950,502
[45] *Apr. 13, 1976

[54] PROCESS FOR WORKING UP THE SCRUBBING SOLUTION OBTAINED IN THE SCRUBBING OF $SO_2$-CONTAINING WASTE GASES

[75] Inventor: Herbert Furkert, Grosskonigsdorf, Germany

[73] Assignee: Chemiebau Dr. A. Zieren Gesellschaft mit beschrankter Haftung & Co. KG, Cologne, Germany

[ * ] Notice: The portion of the term of this patent subsequent to Mar. 5, 1991, has been disclaimed.

[22] Filed: Nov. 23, 1973

[21] Appl. No.: 418,273

Related U.S. Application Data

[63] Continuation-in-part of Ser. Nos. 284,709, Aug. 30, 1972, and Ser. No. 228,258, Feb. 22, 1972, Pat. No. 3,795,731.

[30] Foreign Application Priority Data

Nov. 22, 1972 Germany............................ 2257227
Feb. 19, 1971 Germany............................ 2107910
Aug. 31, 1971 Germany............................ 2143444

[52] U.S. Cl............................. 423/541 A; 423/242
[51] Int. Cl.²................... C01B 17/60; C01B 17/50
[58] Field of Search ....... 423/539, 540, 541, 541 A, 423/242, 522, 531

[56] References Cited
UNITED STATES PATENTS

| | | | |
|---|---|---|---|
| 2,676,090 | 4/1954 | Johnstone........................... | 423/242 |
| 2,862,789 | 12/1958 | Burgress............................. | 423/550 |
| 3,275,407 | 9/1966 | Furkert et al....................... | 423/540 |
| 3,321,275 | 5/1967 | Furkert et al....................... | 423/540 |
| 3,359,069 | 12/1969 | Furkert et al....................... | 423/540 |
| 3,383,170 | 5/1968 | Furkert et al....................... | 423/541 |
| 3,645,683 | 2/1972 | Isbell, Jr. ........................... | 423/540 |
| 3,825,657 | 7/1974 | Jenniges............................. | 423/540 |

OTHER PUBLICATIONS

Olsen, John C, Unit Processes and Principles of Chemical Engineering D. Van Nostrand Co. Inc. NY, NY 1932 pp. 1–3.

Primary Examiner—Oscar R. Vertiz
Assistant Examiner—Gary P. Straub
Attorney, Agent, or Firm—Millen, Raptes & White

[57] ABSTRACT

Process for working up the scrubbing solution obtained during the scrubbing of $SO_2$-containing waste gases, which can also contain $SO_3$, with the use of ammonia, by evaporation in direct heat exchange with hot cracked gas to a water content of between 15 and 55% by weight, cracking of the thus-evaporated mixture at temperatures of between 900° and 1250° C. with the concomitant combustion of a carbon- and/or sulfur-containing fuel to an $SO_2$-containing gas, and processing of the cracked gas, after utilization for evaporation purposes, by contact oxidation to sulfuric acid in accordance with U.S. patent application Ser. 284,709 filed Aug. 30, 1972, characterized in that the scrubbing solution is mixed, prior to or during the evaporation, with a quantity of sulfuric acid sufficient for the liberation of $SO_2$ from 0–83% of the sulfite and/or bisulfite present in the solution.

12 Claims, 1 Drawing Figure

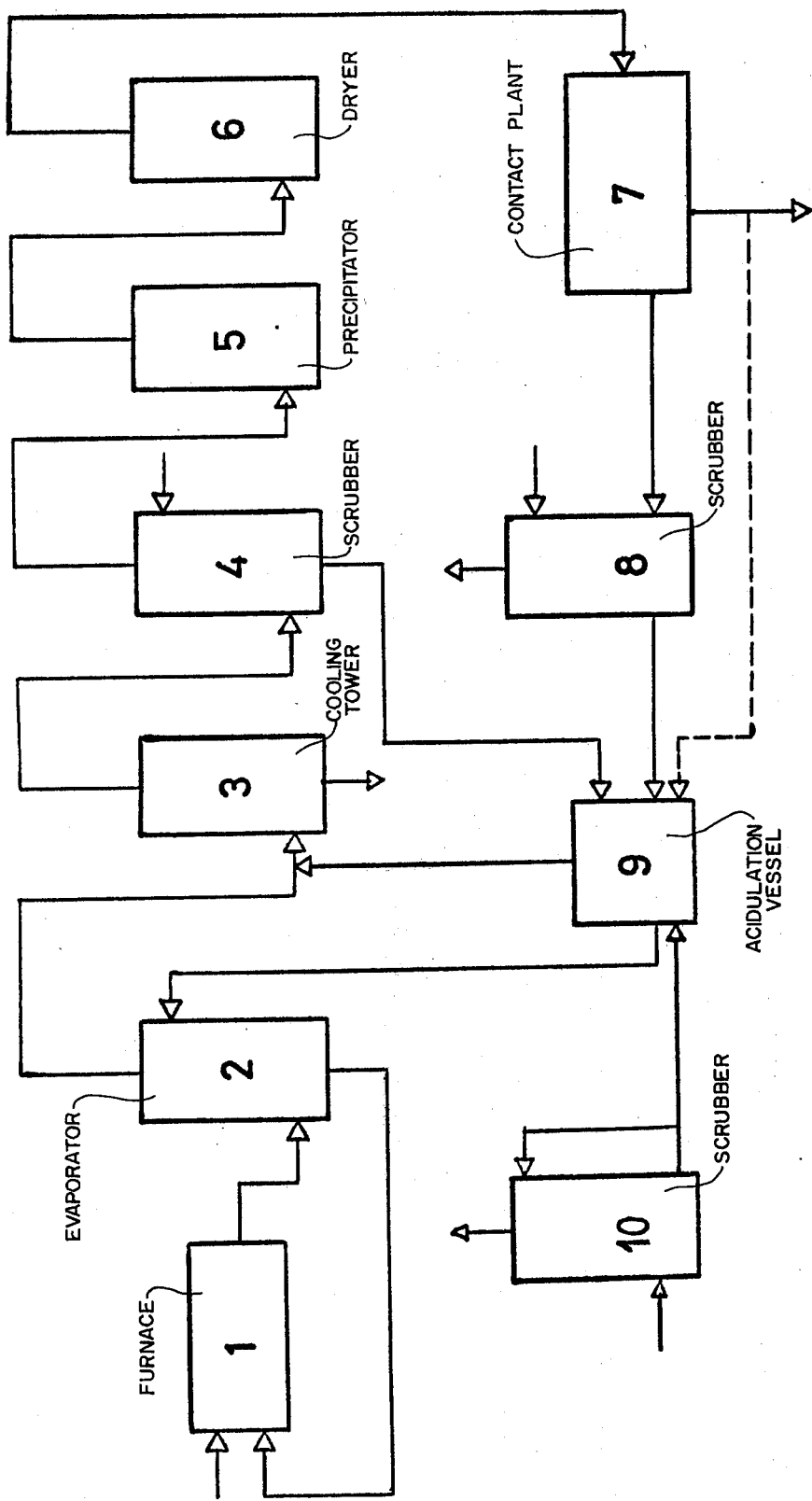

PROCESS FOR WORKING UP THE SCRUBBING SOLUTION OBTAINED IN THE SCRUBBING OF SO$_2$-CONTAINING WASTE GASES

CROSS REFERENCE TO RELATED APPLICATION

This application is a continuation-in-part of copending application Ser. No. 284,709, filed Aug. 30, 1972. The contents of said copending application in their entirety are incorporated by reference herein, and said copending application will hereinafter be referred to as the "main application".

This application is also a continuation-in-part of copending application Ser. No. 228,258 filed Feb. 22, 1972, now U.S. Pat. No. 3,795,731.

This invention relates to a process for working up the scrubbing solution obtained during the scrubbing of SO$_2$-containing waste gases, which also can contain SO$_3$, with the use of ammonia.

It is conventional to wash SO$_2$-containing waste gases, such as, for example flue gas from sulfur-containing fuels, or the final gas of a plant for the manufacture of sulfuric acid according to the contact method, with the use of ammonia. The scrubbing solution circulating through the scrubbing plant contains essentially ammonium sulfite and ammonium bisulfite. In order to keep the scrubbing solution receptive to SO$_2$ absorption, a portion of the solution is separated continuously or at certain intervals from the washing cycle and replaced by ammonia and water. Insofar as the waste gas to be scrubbed also contains sulfur trioxide, or the scrubbing solution has an oxidation potential sufficient for the oxidation of sulfite to sulfate, the scrubbing solution can also contain ammonium sulfate.

In order to eliminate such a scrubbing solution without harm to the environment, it is known to acidify the solution with ammonium bisulfate, under the liberation of SO$_2$, to obtain the ammonium sulfate from the solution by evaporation, and to split same stepwise into ammonia and SO$_2$. This process, though making it possible to recover the ammonia required for the waste gas scrubbing step, requires, as seen in total, a considerable expense in initial apparatus for the multistage plant necessary for this purpose (DAS [German Published Application] 1,267,671).

It has also been known to split the scrubbing solution directly in a combustion chamber into sulfur dioxide, nitrogen, and steam, and then to utilize the thermal energy of the hot combustion gases in a waste heat boiler, and to use the gas for sulfuric acid or sulfur production. This mode of operation requires a large amount of energy in the combustion chamber, since the entire water content of the scrubbing solution must be vaporized (Chem. Eng. Progr. 68 (1972), No. 8, p. 50; German Pat. No. 1,467,005).

According to the process of the main application, it has been suggested to work up the scrubbing solution obtained in the washing of SO$_2$-containing waste gases with the use of ammonia, with exploitation of the S-content of the solution. This is done by combining the scrubbing solution with an amount of sulfuric acid at least sufficient for the liberation of SO$_2$ from the ammonium sulfite and ammonium bisulfite contained therein; evaporating the thus-obtained mixture by direct heat exchange with hot cracked gas to a water content of between 15 and 55% by weight; splitting the evaporated mixture at temperatures of between 900° and 1250° C. to an SO$_2$-containing gas, with the simultaneous combustion of a carbon- and/or sulfur-containing fuel; and processing the cracked gas, after use for evaporation, in a conventional manner by contact oxidation to sulfuric acid (DAS 2,143,444).

It has now been found that, in the process according to the main application, the amount of sulfuric acid added to the scrubbing solution can be considerably reduced and, in borderline cases, can even be omitted, without essential amount of ammonia being desorbed from the solution during the vaporization and contaminating the cracked gas.

The improved process for the working up of the scrubbing solution obtained during the washing of waste gases which contain SO$_2$ and optionally SO$_3$ with the use of ammonia resides in that the scrubbing solution is evaporated by direct heat exchange with hot cracked gas to a water content of between 15 and 55% by weight; the thus-evaporated mixture is split, at temperatures of between 900° and 1250° C., into an SO$_2$-containing gas under the concomitant combustion of a carbon- and/or sulfur-containing fuel; and the cracked [split] gas, after use for evaporation purposes, is processed to sulfuric acid by the contact oxidation method. According to the invention, this process is characterized in that the scrubbing solution is combined, before or during the evaporation, with a quantity of sulfuric acid sufficient for the liberation of SO$_2$ from 0–83% of the sulfite and/or bisulfite present in the solution. Preferably, the scrubbing solution is combined with an amount of sulfuric acid sufficient for the liberation of SO$_2$ from 10–20% of the sulfite and/or hydrogen sulfite.

Due to the fact that the amount of sulfuric acid added is reduced as compared to the main application, a considerable simplification of the process is attained. This holds true if the addition of sulfuric acid, with the SO$_2$ liberation, takes place prior to the evaporation, as well as if the sulfuric acid is introduced by spraying directly into the evaporation tower. By adding a considerably lesser quantity of sulfuric acid than in the process of the main application, fuel and air are saved during the cracking step (especially if an aqueous sulfuric acid is added), and consequently, a cracked gas is obtained which is richer in SO$_2$. Even without the addition of acid, only a minor portion of the ammonia bound in the scrubbing solution enters the cracked gas during the evaporation; the predominant portion remains bound to sulfate in the evaporated scrubbing solution and is oxidized during the cracking step to nitrogen. The desorbed ammonia, amounting quantitatively generally to 0 to about 3% of the ammonia bound in the scrubbing solution, can be easily removed before the further processing of the gas by cooling and washing.

It has been found that in the customary exhausted scrubbing solutions, which contain, in addition to NH$_4$HSO$_3$, generally 5–15% by weight of (NH$_4$)$_2$SO$_3$, maximally about 83% of the amount of sulfuric acid required for the liberation of the entire SO$_2$ (the stoichiometric amount) is necessary to reduce, in the evaporation stage, the NH$_3$ transfer to the cracked gas to practically 0%. In general, an addition of sulfuric acid of 67% of the stoichiometric quantity will be sufficient to limit the ammonia transfer to the cracked gas to about 1% of the amount bound in the scrubbing solution to sulfite and bisulfite. Furthermore, the amount of the sulfuric acid to be added is dependent on the factors of the scrubbing solution determining the oxidation of the tetravalent to the hexavalent sulfur, such as the partial pressure of oxygen in the cracked gas, the heavy metal ion concentration in the scrubbing solution, and the temperature. Supposedly, the above-mentioned oxidation of the tetravalent sulfur is the reason for the fact that the acid addition can be so substantially reduced.

The entire S content of the scrubbing solution is obtained, according to the process of this invention, as concentrated sulfuric acid; the ammonia, except for the minor proportion absorbed by the cracked gas, is oxidized practically completely to nitrogen in the cracking stage. Of course it is possible to add, in place of a further processing stage to sulfuric acid, also a stage wherein elemental sulfur is produced. In spite of the annihilation of the ammonia, the process operates with low expenses for the operating medium, because the heat of the hot cracked gases is exploited for the evaporation of the water from the scrubbing solution. The preferably added amount of sulfuric acid is reacted with the ammonium sulfite contained in the scrubbing solution in accordance with the equation:

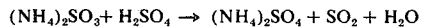

$$(NH_4)_2SO_3 + H_2SO_4 \rightarrow (NH_4)_2SO_4 + SO_2 + H_2O$$

whereby the partial $NH_3$ pressure above the solution is considerably reduced.

Preferably, the solution is evaporated prior to the cracking step to a water content of 25–50% by weight of $H_2O$. In contrast to the process of the main application, no ammonium salts are crystallized during this step, because the $(NH_4)_2SO_4$ concentration is substantially lower due to the reduced addition of acid, and the solubilities of the ammonium sulfite and the ammonium bisulfite are not exceeded, either. By the addition of a small, sub-stoichiometric amount of sulfuric acid, the entire solubility is even improved, because the concentration of the less soluble ammonium sulfite is reduced in favor of the more readily soluble ammonium sulfate.

The preferred temperature range of the cracking step is 1000°–1100° C. In order to keep the formation of nitrogen oxide during the cracking step negligibly small, the $O_2$ content of the cracked gas at the outlet of the cracking furnace is suitably maintained at a value of between 1 and 10% by volume. The residence time of the material to be cracked in the cracking furnace ranges preferably between 0.3 and 15 seconds. Examples for suitable fuels are natural gas, fuel oil, especially a fuel oil rich in sulfur, hydrogen sulfide, and sulfur. These fuels can be employed individually or together.

In the evaporation stage, the cracked gas is cooled from the cracking temperature of, for example, 1000°–1100° C., to preferably 100°–350° C. The temperature of the cracked gas when discharged from the evaporation stage determines its maximum water content. The steam content must be so high that the entire water introduced with the scrubbing solution and with the sulfuric acid optionally employed for acidification purposes is removed by the cracked gas. The latter, therefore, serves as the vehicle for removing the water from the evaporation stage. After leaving the evaporation stage, the cracked gas is cooled to about 20°–65° C., preferably 30°–40° C. By the cooling of the cracked gas, the steam contained therein is condensed for the largest part. The water condensed out of the cracked gas contains $SO_2$; in order to remove this $SO_2$, the condensate is treated with air in a stripper column. The $SO_2$-laden air is suitably employed as the combustion air in the cracking stage.

In accordance with a preferred embodiment of the invention, the cracked gas, after being used for evaporation purposes, is scrubbed, and the scrubbing acid obtained during the cracked gas washing step is added to the scrubbing solution to be worked up. The cracked gas scrubbing step is advantageously conducted in a tower disposed downstream of the evaporating tower; this additional tower is operated under hot conditions, and no water condenses from the cracked gas. The scrubbing acid if formed from the $SO_3$ content of the cracked gas. Of course, in addition to the scrubbing acid, also other waste sulfuric acids can be added to the scrubbing solution.

In accordance with another embodiment of this invention, the scrubbing solution to be worked up is mixed with a portion of the product acid. Product acid will be utilized in the process of the present invention if an insufficient amount of scrubbing acid has been formed and otherwise no waste sulfuric acid is available. This is the case, in particular, during the flue gas desulfuration by scrubbing with the use of ammonia.

The scrubbing solution and the sulfuric acid can be introduced through nozzles into a tower, through which flows the hot cracked gas in the upward direction. In case of this separate introduction of solution and acid, the cracked gas must be sprayed with sulfuric acid chronologically after being sprayed with solution, so that the cracked gas removes a minimum amount of ammonia from the evaporation tower. Suitably, a part of the sulfuric acid is introduced together with the scrubbing solution, and the remainder of the sulfuric acid is fed above this first introduction point, so that any ammonia which may have been absorbed by the cracked gas can be collected.

The invention will be explained hereinbelow in greater detail with reference to a schematic flow sheet of a plant for conducting the process of this invention.

According to the FIGURE, the plant for working up the scrubbing solution comprises a cracking furnace 1, and evaporator 2, and a mixer 9. Units 3 through 8 denote a conventional sulfuric acid plant, consisting of a cooling tower 3, a scrubbing tower 4, an electrostatic gas purification plant 5, a drying tower 6, a contact and absorption plant 7, and a final gas scrubbing plant 8.

Final gas from the contact and absorption plant 7 is scrubbed in tower 8, and flue gas is scrubbed in tower 10 with the use of ammonia, thus obtaining solutions containing ammonium sulfite and ammonium bisulfite. These solutions are combined, in the mixer 9, with scrubbing acid from the scrubbing tower 4 and optionally with product acid from the contact plant 7 (dashed line). The acid can also be added in the evaporator. The solution formed in the mixer 9 is introduced through nozzles into the evaporation tower 2 and brought into contact therein with the cracked gases of a temperature of about 1000° C. from the cracking furnace 1. A suspension is obtained in the sump of the evaporation tower 2, which suspension is introduced into the cracking furnace 1. Simultaneously, a sulfur-containing fuel oil is burned in the cracking furnace 1. The $SO_2$-containing cracked gas formed in furnace 1 flows through the evaporator 2, thus being charged with steam which is, to the largest part, condensed out again in the cooling tower 3. The gas then is conveyed in a conventional manner through the scrubbing tower 4, the electrostatic gas purifying stage 5, and the drying tower 6, into the contact plant.

Without further elaboration, it is believed that one skilled in the art can, using the preceding description, utilize the present invention to its fullest extent. The following preferred specific embodiments are, therefore, to be construed as merely illustrative and not limitative of the remainder of the specification and claims in any way whatsoever.

EXAMPLE 1

1.925 . 10⁵ Nm³/h. of flue gas with
215.5 Nm³/h. of $SO_2$ and
11.7 Nm³/h. of $SO_3$ is scrubbed in one stage with an ammonium sulfite/ammonium bisulfite solution.

Of the scrubbing solution circulated through the scrubbing stage, 2.39 t./h. is withdrawn and replaced by the same amount by weight of 10.5% strength ammonia. The scrubbing solution has the following composition:

17.2 % by weight of ammonium sulfate
13.4 % by weight of ammonium bisulfite
9.3 % by weight of ammonium sulfite
60.0 % by weight of water.

The scrubbing solution is mixed with 188 kg/h. of 15% strength sulfuric acid from the scrubbing tower of the sulfuric acid plant and directly evaporated with 3,947 Nm³/h. of cracked gas having a temperature of 1000° C.

The product thus obtained is 1,408 kg. of evaporated suspension with 32.0 % by weight of $(NH_4)_2SO_4$,
11.1 % by weight of $(NH_4)_2SO_3$,
26.9 % by weight of $NH_4HSO_3$,
30.0 % by weight of $H_2O$.

During the evaporation, 6.8 kg./h. of ammonia passes over into the cracked gas, and is separated again in the following scurbbing stage with the formation of the sulfuric acid which contains ammonium sulfate. After cooling and drying, 2,628 Nm³/h. of dry cracked gas is available, which can be processed into sulfuric acid. This gas contains 7.0 vol. % of $SO_2$; 4.5 vol. % of $O_2$; 6.5 vol. % of $CO_2$; and 82.0 vol.% of $N_2$.

EXAMPLE 2

The scrubbing solution, obtained according to Example 1, is mixed with 136.8 kg./h. of $H_2SO_4$ (partially as 15% scrubbing acid, partially as 98% product acid), and is evaporated in the cracked gas stream, thus obtaining 1,280 kg./h. of evaporated suspension with 36.7% by weight of $(NH_4)_2SO_4$, 33.3% by weight of $NH_4HSO_3$, and 30% by weight of $H_2O$.

During the evaporation, 4.7 kg./h. of ammonia passes over into the cracked gas, and this amount is separated again in the subsequent cracked gas scrubbing stage under the formation of sulfuric acid containing ammonium sulfate. After cooling and drying, 2,622 Nm³/h. of dry cracked gas is available which can be processed to sulfuric acid. This gas contains 7.3 vol.% of $SO_2$; 4.5 vol.% of $O_2$; 6.4 vol.% of $CO_2$; and 81.8 vol.% of $N_2$.

EXAMPLE 3

The scrubbing solution, obtained as in Example 1, is mixed with 167.2 kg. of $H_2SO_4$ (partially as a 15% scrubbing solution, partially as 98% product acid), and is evaporated in the cracked gas stream, thus obtaining 1,251 kg. of evaporated suspension with 40.8% by weight of $(NH_4)_2SO_4$, 29.2% by weight of $NH_4HSO_3$, and 30.0% by weight of $H_2O$.

During the evaporation, 2.3 kg./h. of ammonia passes over into the cracked gas, and this amount is removed again in the subsequent scrubbing stage with the formation of sulfuric acid which contains ammonium sulfate. After cooling and drying, 2,628 Nm³/h. of dry cracked gas is available, which can be processed into sulfuric acid. This gas contains 7.5 vol.% of $SO_2$; 4.5 vol.% of $O_2$; 6.4 vol.% of $CO_2$; and 81.6 vol.% of $N_2$.

EXAMPLE 4

The scrubbing solution obtained according to Example 1 is mixed with 210 kg./h. of $H_2SO_4$ (partially as a 15% scrubbing solution, partially as a 98% product acid), and is evaporated in the cracked gas stream, thus producing 1,211 kg./h. of evaporated suspension having the following composition: 46.9% by weight of $(NH_4)_2SO_4$, 23.1% by weight of $NH_4HSO_3$, and 30.0% by weight of $H_2O$.

During the evaporation, no ammonia passes into the cracked gas. After cooling and drying, 2,639 Nm³/h. of dry cracked gas is available, which can be processed into sulfuric acid. This gas contains 7.9 vol.% of $SO_2$; 4.5 vol.% of $O_2$; 6.4 vol.% of $CO_2$; and 81.2 vol.% of $N_2$.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process which comprises scrubbing an $SO_2$-containing gas with an aqueous ammonia solution to form a scrubbing solution containing ammonium sulfite and ammonium bisulfite as reaction products; acidulating said reaction products with sulfuric acid to form $SO_2$ and aqueous ammonium sulfate; heating the concentrated aqueous ammonium sulfate to a temperature of 900°–1250°C in a combustion chamber burning a carbon or sulfur containing fuel in the presence of sufficient oxygen to maintain an oxygen content of 1–10 vol. % in the gas exiting from the combustion chamber to form a hot split gas consisting essentially of sulfur dioxide, sulfur trioxide, molecular nitrogen, molecular oxygen and water vapor; and heat exchanging said hot split gas with said aqueous ammonium sulfate to evaporate said aqueous ammonium sulfate to a concentrate having a water content of 15–55 wt. %, thereby cooling said hot split gas, the improvement which comprises:

acidulating said reaction products with a quantity of sulfuric acid sufficient to liberate $SO_2$ from 10–20% of the ammonium sulfite and ammonium bisulfite in said scrubbing solution to reduce the transfer of ammonia from the scrubbing solution to the hot split gas during evaporation of said hot split gas to 0–3% of the ammonia bound to the ammonium sulfite and ammonium bisulfite in the scrubbing solution and to avoid crystallization of ammonium salts during said evaporation step.

2. A process according to claim 1, further comprising conducting said acidulation step and heat exchange step in a single operational step.

3. A process according to claim 1, wherein the heat exchanged split gas is washed with sulfuric acid to absorb ammonia therefrom 4. Process according to claim 1, wherein the hot split gas, after being used for evaporation purposes, is scrubbed with sulfuric acid to remove ammonia therefrom and the product acid thereby obtained is added to the scrubbing solution to be worked up.

5. Process according to claim 4, wherein a portion of the product acid is added to the scrubbing solution to be worked up.

6. A process according to claim 1, wherein said aqueous ammonium sulfate is evaporated to a water concentration of 25–50 wt. %.

7. A process according to claim 1, wherein said hot split gas is cooled to a temperature of 100°–350°C.

8. A process according to claim 7, further comprising additionally cooling said hot split gas to below 100°C to form an aqueous condensate containing $SO_2$ dissolved therein.

9. A process according to claim 8, further comprising stripping said condensate to form an $SO_2$-laden gas, and feeding resultant $SO_2$-laden gas into said combustion chamber.

10. A process according to claim 9, wherein said resultant $SO_2$-laden gas is scrubbed counter-currently with aqueous ammonia to form an aqueous solution containing ammonium sulfite, ammonium bisulfite and ammonium sulfate as reaction products, further comprising spraying said solution together with sulfuric acid into the evaporation apparatus.

11. A process according to claim 10, wherein the $H_2SO_4$ required for the liberation of $SO_2$ from said aqueous solution is sprayed together with said solution.

12. Process according to claim 10, wherein the scrubbing solution and the sulfuric acid are introduced through nozzles into a tower, through which the hot cracked gas flows in the upward direction, wherein the feed point of at least a portion of the sulfuric acid is provided on the gas downstream side of the feed point for the scrubbing solution.

* * * * *